(12) United States Patent
Shigehara et al.

(10) Patent No.: US 6,771,358 B1
(45) Date of Patent: Aug. 3, 2004

(54) BRANCH LINE MONITORING SYSTEM AND BRANCH LINE MONITORING METHOD

(75) Inventors: Masakazu Shigehara, Yokohama (JP); Hiroo Kanamori, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 541 days.

(21) Appl. No.: 09/637,571

(22) Filed: Aug. 14, 2000

Related U.S. Application Data

(63) Continuation-in-part of application No. PCT/JP99/00510, filed on Feb. 5, 1999.

(30) Foreign Application Priority Data

Feb. 23, 1998 (JP) ............................................ 10-040277

(51) Int. Cl.[7] ........................ H04B 10/08; H04B 17/00; G01N 21/00
(52) U.S. Cl. .......................... 356/73.1; 398/13; 398/20
(58) Field of Search ........................ 356/73.1; 359/110, 359/173, 177; 398/13, 20, 33, 82, 141, 177

(56) References Cited

U.S. PATENT DOCUMENTS

| | | | | |
|---|---|---|---|---|
| 5,383,015 A | * | 1/1995 | Grimes ...................... | 356/73.1 |
| 5,491,573 A | * | 2/1996 | Shipley ...................... | 359/110 |
| 5,757,487 A | * | 5/1998 | Kersey ........................ | 356/450 |
| 6,028,661 A | * | 2/2000 | Minami et al. ............ | 356/73.1 |
| 6,388,741 B1 | * | 5/2002 | Beller ........................ | 356/73.1 |
| 6,512,610 B1 | * | 1/2003 | Minami et al. ............. | 359/110 |

FOREIGN PATENT DOCUMENTS

| | | |
|---|---|---|
| JP | 2-141641 | 5/1990 |
| JP | 2-141641 | 6/1990 |
| JP | 4-220541 | 11/1992 |
| JP | 6-350530 | 12/1994 |
| JP | 9-135206 | 5/1997 |
| JP | 9-145941 | 6/1997 |

OTHER PUBLICATIONS

F. Izumita et al., A Study on Fading Noise Reduction in Coherent OTDR, 1991 Fall Convention Record of the IEICE, p. 4–48 (with translation).

K. Tanaka et al., Compensation Method for the Temperature-dependent Channel Drift of a WDM-PDS Using a 1.6 μm Band Wavelength Tunable OTDR, 1997 Communication Society Record of the IEICE, pp. 548–549 (with translation).

* cited by examiner

*Primary Examiner*—Kinfe-Michael Negash
(74) *Attorney, Agent, or Firm*—McDermott Will & Emery LLP

(57) ABSTRACT

The present invention relates to a branch line monitoring system and branch line monitoring method comprising a configuration which improves the S/N ratio of measurement information and can be realized inexpensively. This system is provided with optical filters which correspond to optical fiber lines to be monitored as branch lines. These optical filters each have such a cutoff characteristic as to cut of f respective one channel of monitor light but transmit therethrough the remaining monitor light and signal light. When the optical filters having such a cutoff characteristic are provided, each of the optical fiber lines is monitored by use of a plurality of channels of monitor light other than the one cut off by the optical filter provided so as to correspond thereto. Consequently, as compared with the case where one optical fiber line is monitored by its corresponding one channel of monitor light, the S/N ratio of measurement information is improved, whereby highly accurate monitoring is possible.

15 Claims, 12 Drawing Sheets

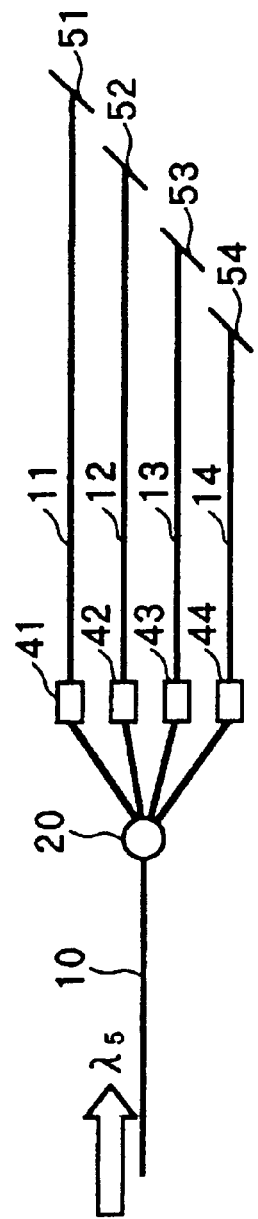
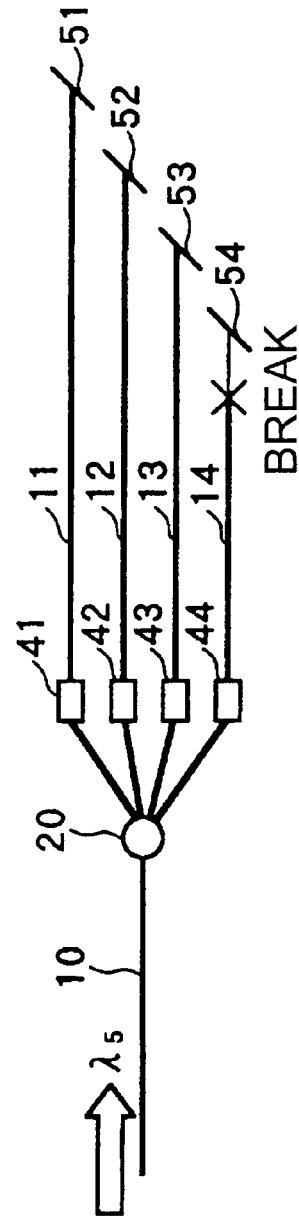
Fig.5A
Fig.5B

BRANCH LINE MONITORING SYSTEM AND BRANCH LINE MONITORING METHOD

RELATED APPLICATIONS

This is a Continuation-In-Part application of International Patent application serial No. PCT/JP99/00510 filed on Feb. 5, 1999, now pending.

BACKGROUND OF THE INVENTION

1. Field of the Invention

The present invention relates to a branch line monitoring system and branch line monitoring method for monitoring, for each of branch lines branched into n lines in a 1:n ($\geq 3$) optical communications line, a loss distribution state along a longitudinal direction of the branch line including breaks thereof.

2. Related Background Art

Conventionally known as an optical line monitoring system for monitoring loss distribution states of optical fiber lines, which are optical communications lines, along their longitudinal direction including their breaks is a system utilizing an OTDR (Optical Time Domain Reflectometer). The OTDR introduces monitor light into an optical fiber line, detects as a function of time the intensity of part of the monitor light scattered backward (backscattering light) due to the loss in the optical fiber line or the like, and monitors breaks of the optical fiber line, the loss distribution state of the optical fiber line along the longitudinal direction, and the like according to the result of detection.

An example of the OTDR applied to monitoring each of a plurality of branched optical fiber lines is an apparatus disclosed in Japanese Patent Application Laid-Open No. HEI 2-141641 (hereinafter referred to as first conventional example). The loss distribution measuring apparatus in accordance with the first conventional example is provided with band filters corresponding to a plurality of optical fiber lines which are branch lines, respectively, each band filter selectively transmitting therethrough one of a plurality of channels of monitor light having wavelengths different from each other. Also, the first conventional example has such a configuration that only one channel of monitor light is propagated through its corresponding one optical fiber line, so as to sequentially monitor the respective states (including breaks and loss distribution fluctuations) of the optical fiber lines.

On the other hand, the apparatus described in IEICE SB-11-3, Spring 1997 (hereinafter referred to as second conventional example) has a configuration in which an AWG (Arrayed Waveguide Grating) is employed as a branching device for monitor light, so as to individually monitor the respective states of a plurality of branched optical fiber lines.

SUMMARY OF THE INVENTION

The inventors have studied the above-mentioned conventional techniques and, as a result, have found problems as follows.

Usually employed when monitoring a plurality of branched optical fiber lines is a configuration in which substantially the same quantity of monitor light is distributed to each optical fiber line, i.e., the intensity of each branched monitor light component introduced to the respective optical fiber line is 1/n. In such a configuration, the first conventional example monitors each of a plurality of optical fiber lines by propagating therethrough its corresponding one channel of monitor light, there by yielding a narrow dynamic range (measurement wavelength band) and low S/N ratio for each monitor light wavelength. In the second conventional example, on the other hand, operations of the AWG are sensitive to changes in temperature, thereby necessitating temperature control by use of a Peltier device or the like, which increases the cost.

Further, as described in IEICE B-588, Autumn 1991, OTDR apparatus using a light source with a narrow oscillation wavelength band for monitor light generate fading noise due to a high coherence of the light source, thereby failing to carry out favorable measurement.

For overcoming the problems mentioned above, it is an object of the present invention to provide a branch line monitoring system and branch line monitoring method having a structure which improves the S/N ratio of measured information so as to enable highly accurate measurement and can be made at a low cost.

The present invention provides a branch line monitoring system and branch line monitoring method for monitoring each of n ($\geq 3$) branch lines into which a predetermined wavelength of signal light is introduced by way of a branching device, the branch line monitoring system and branch line monitoring method comprising a configuration for broadening the measurement wavelength band of each optical fiber line, which is an optical communications line, so as to improve the S/N ratio of measurement information, thereby enabling highly accurate line monitoring.

Namely, the branch line monitoring system realizing the branch line monitoring method in accordance with the present invention comprises: a light source for emitting n channels of monitor light having wavelengths different from the wavelength of signal light and different from each other; a monitor light introducing structure for introducing into each of the branch lines by way of the branching device the n channels of monitor light emitted from the light source; optical filters, disposed so as to correspond to the branch lines, respectively, on the corresponding branch lines or at respective end portions of the branch lines; a backscattering light detector for detecting, by way of the branching device, backscattering light components of the channels of monitor light generated in the respective branch lines; and an arithmetic unit for specifying, according to a result of detection obtained by the backscattering light detector, at least a loss distribution state of each of the branch lines along a longitudinal direction thereof (including breaks of each branch line, loss fluctuations in each branch line along the longitudinal direction thereof, their occurring sites, and the like).

In particular, each of the above-mentioned optical filters cuts off (means therefor including reflection-and absorption) respective one channel of the introduced monitor light and transmits therethrough the remaining (n−1) channels of the signal light. When each branch line is provided with an optical filter having such a cutoff characteristic, each branch line is monitored by the (n−1) channels of the monitor light other than the channel of monitor light cut off by the optical filter provided so as to correspond thereto, whereby each branch line can be monitored by use of a measurement wavelength band broader than that conventionally available, which improves the S/N ratio of measurement information. Namely, in the branch line monitoring system and branch line monitoring method in accordance with the present invention, the result of measurement (result of detection according to the backscattering light detector) obtained concerning each channel of monitor light includes information about (n−1) branch lines other than the branch line provided with the optical filter for cutting it off, whereby, when one branch line subjected to monitoring is taken into consideration, it would be monitored by (N−1) channels of monitor light other than the cut-off channel of monitor light. Therefore, the S/N ratio of measurement information is improved as compared with the conventional systems, whereby sites of breaks, sites of loss fluctuations, and the like in each of the n branch lines can be specified with a high accuracy. Here, such a state of each branch line is obtained, after the intensity of backscattering light of each of the monitor light components generated in the branch line is detected, by way of a special arithmetic operation process by the above-mentioned arithmetic unit according to the result of detection. The above-mentioned n channels of monitor light may be emitted to the respective branch lines from the above-mentioned light source either simultaneously or sequentially at a predetermined interval of time.

The present invention will be more fully understood from the detailed description given hereinbelow and the accompanying drawings, which are given byway of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 5A and 5B are views for explaining how probe light having a wavelength of $\lambda 5$ emitted from the wavelength-variable light source propagates, showing the states of propagation in individual branch lines under a normal operation and in the case where a failure has occurred in part of the branch lines, respectively;

DESCRIPTION OF THE PREFERRED EMBODIMENTS

Figure 1:
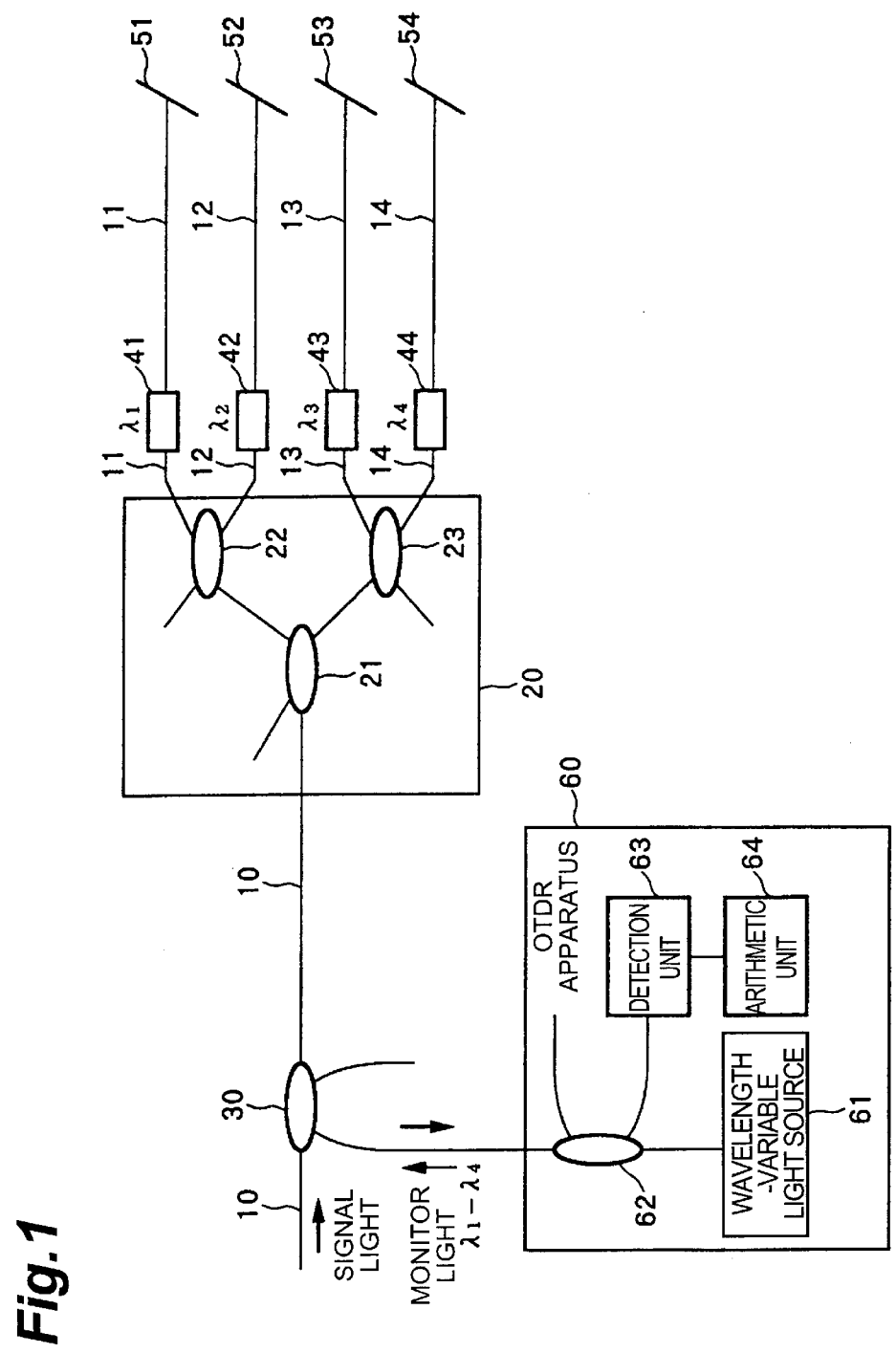
FIG. 1 is a view showing a basic configuration of an embodiment of the branch line monitoring system in accordance with the present invention.

In the following, embodiments of the branch line monitoring system and branch line monitoring method in accordance with the present invention will be explained with reference to FIGS. 1, 2, 3A to 6B, 7 to 10, 11A, 11B, and 12. Here, constituents identical to each other in the drawings will be referred to with numerals identical to each other without repeating their overlapping explanations.

The branch line monitoring system in accordance with the present invention is characterized in that, for each of n ($\geq 3$) optical fiber lines (branch lines) branched by way of a branching device, an optical filter having such a cutoff characteristic as to cut off (means thereof including reflection and absorption) one of n channels of monitor light but transmit therethrough the remaining (N−1) channels of monitor light and signal light is provided so as to correspond thereto. Namely, the branch line monitoring system comprises, at least, a light source for emitting n ($\geq 3$) channels of monitor light having wavelengths different from the wavelength of signal light and different from each other; a monitor light introducing structure for introducing into each of the branch lines by way of the branching device the n channels of monitor light; n optical filters, each mentioned above, disposed so as to correspond to the n branch lines, respectively, on the corresponding branch lines or at respective end portions of the branch lines; a backscattering light detector for detecting, by way of the branching device, backscattering light components of the respective channels of monitor light generated in the n branch lines; and an arithmetic unit for specifying, according to a result of detection of backscattering light obtained by the backscattering light detector, respective states of the n branch lines (including breaks of optical fibers, which are branch lines, and how their loss fluctuates along the longitudinal direction thereof). The above-mentioned n channels of monitor light may be emitted to the respective branch lines from the above-mentioned light source either simultaneously or sequentially at a predetermined interval of time.

The n channels of monitor light emitted from the light source are introduced into each of the branch lines by the monitor light introducing structure by way of the branching device. Therefore, in each of the n branch lines, (N−1) channels of monitor light other than the one cut off by the optical filter prepared so as to correspond to the respective branch line would propagate therethrough. As (n−1) channels of monitor light other than the one cut off by the optical fiber thus propagate through the n branch lines, backscattering light occurs according to the states of these branch lines. Then, the arithmetic unit carries out a special arithmetic operation according to the result of detection (intensity of measured backscattering light) detected by the backscattering photodetector, thereby specifying the respective states of n branch lines, e.g., loss distribution states (including breaks of branch lines) along the longitudinal direction thereof. In other words, each of the branch lines in the branch line monitoring system in accordance with the present invention would be monitored by (N−1) channels of monitor light other than the one cut off by the optical filter corresponding thereto. As a result, utilizing a measurement wavelength band broader than that conventionally available improves the S/N ratio of measurement information, thus making it possible to monitor each branch line with a higher accuracy.

Here, each of the above-mentioned n optical filters preferably has a transmission loss of 30% or more, more preferably 90% or more, with respect to the monitor light to be cut off in the n channels of monitor light. If the transmission loss is 30% or higher, then the respective states of n branch lines can be measured with a better S/N ratio than that in the measurement using a conventional band-pass filter. If the transmission loss is 90% or higher, then the noise component will be scarce, whereby the respective states of n branch lines can be measured with a favorable S/N ratio.

Preferably, each of the above-mentioned n optical filters employs an optical fiber grating. It is because of the fact that, since the optical fiber grating has a reflection wavelength with a narrow band, it can narrow the wavelength intervals of the monitor light, so as to narrow the wavelength band of the whole monitor wavelength band light, and facilitates temperature compensation. On the other hand, a star coupler is preferably employed as the above-mentioned branching device. In this case, the branching device is realized at a lower cost.

Also, the branch line monitoring system in accordance with the present invention is characterized in that the wavelength bandwidth of each monitor light component emitted from the light source is definite, the cutoff wavelength bandwidth of each of the n optical filters is definite, and the wavelength bandwidth of each monitor light is included in the cutoff wavelength band of any of the above-mentioned n optical filters. When the wavelength band of each monitor light component is thus set so as to be included in the cutoff wavelength band of any of the individual optical filters, transmitting noise is lowered, whereby the respective states of n branch lines can be measured with a favorable S/N ratio.

The branch line monitoring system in accordance with the present invention may further comprise a temperature control unit for controlling respective temperatures of the above-mentioned n optical filters, whereas it is more preferable that the n optical filters each have a constant cutoff wavelength independent of temperature. In either case, the respective states of n branch lines can be measured stably.

In the first embodiment of the present invention, letting $\lambda i$ (i=1, 2, ..., n) be the wavelength of monitor light, $m(\lambda i)$ be the result of detection concerning the backscattering light of the monitor light at this wavelength $\lambda i$, and k be the constant of proportion, the above-mentioned arithmetic unit determines a parameter Ri indicative of the loss distribution state along the longitudinal direction of the branch line provided with the optical filter for cutting off the wavelength $\lambda i$ of monitor light (including breaks of the branch line) in the n branch lines according to the following arithmetic expressions:

$$M = \sum_{i=1}^{n} m(\lambda i)$$

$$Ri = k\{M - (n-1) \cdot \underline{m}(\lambda 1)\} (i=1, 2, \ldots, n).$$

Namely, in the first embodiment, the respective states of n branch lines with an improved S/N ratio of measurement information can be determined with a high accuracy. Though the above-mentioned first embodiment monitors the state of each branch line by utilizing n channels of monitor light different from the signal light wavelength, occurrences of failures in any branch line (e.g., breaks of at least one branch line) can also be detected by utilizing probe light having a wavelength (not cut off by any of the optical filters) which is different from the signal light wavelength and wavelengths of n channels of monitor light. When such a configuration is combined with the configuration of the first embodiment, all the n branch lines can be monitored simultaneously, and the monitoring at the time of a normal operation can be simplified.

Further, a second embodiment of the branch line monitoring system in accordance with the present invention comprises a configuration which monitors the state of each branch line by utilizing the probe light (having a wavelength not cut off by any of the optical filters) such as one mentioned above and n channels of monitor light (wavelength $\lambda i$). Namely, letting $\lambda 0$ be the wavelength of probe light, and $m(\lambda 0)$ be the result of detection obtained by the above-mentioned backscattering light detector concerning the backscattering light of the probe light, the arithmetic unit in accordance with the second embodiment determines the parameter Ri indicative of the loss distribution state along the longitudinal direction of the branch line provided with the optical filter for cutting off the wavelength $\lambda i$ of monitor light (including breaks of the branch line) in the n branch lines according to the following arithmetic expression:

$$Ri = k\{m(\lambda 0) - m(\lambda i)\} (i=1, 2, \ldots, n).$$

According to this configuration, the state of a desirable branch line can be determined by at least two backscattering light measurement operations. Here, if a branch line to be measured has a wavelength-dependent loss (e.g., bending loss), errors will occur in the absolute value of loss (measured value). However, the state of a branch line can sufficiently be specified to such an extent as to locate at least sites of breaks and sites where loss fluctuates greatly.

As a more specific configuration of each of the above-mentioned embodiments, the monitoring of branch lines branched in a 1:4 fashion, i.e., a branch line monitoring system with n=4, will now be explained.

First, the configuration of the branch line monitoring system common to the individual embodiments will be explained. FIG. 1 is a view showing the configuration of the branch line monitoring system for monitoring four branch lines branched by way of a branching device.

The depicted 1:4 optical communications line comprises an optical fiber line 10 which is a main line, four optical fiber lines 11 to 14 which are branch lines, and a branching section 20. The branching section 20 is constituted by three branching devices 21 to 23 each branching into two. Here, a star coupler is preferably employed as the branching section 20 in view of the fact that it can be constituted inexpensively. In this 1:4 optical communications line, the signal light propagated through the optical fiber line 10 is branched into four parts by the branching section 20, so as to propagate through their respective optical fiber lines 11 to 14.

In the 1:4 optical communications line, a directional coupler 30 (included in the monitor light introducing structure) is disposed at a predetermined position of the optical fiber line 10 located in front of the branching section 20. The directional coupler 30 causes the signal light to propagate through the optical fiber transmission line 10 as it is, and introduces into the optical fiber transmission line 10 the monitor light outputted from an OTDR apparatus 60 so as to make it propagate through the individual optical fiber lines 11 to 14 by way of the branching section 20. Also, the directional coupler 30 introduces into the OTDR apparatus 60 the backscattering light of each monitor light component propagating through the optical fiber line 10 by way of the branching section 20.

The four optical fiber lines 11 to 14 are provided with their respective optical filters 41 to 44 each disposed thereon or at least at any end portion thereof. Each of the optical filters 41 to 44 selectively cuts off (means therefor including reflection and absorption) respective one of four channels of monitor light $\lambda 1$ to $\lambda 4$ ($\lambda 1$ to $\lambda 4$ being wavelengths different from each other) emitted from the OTDR apparatus 60. Namely, the optical filter 41 transmits therethrough the wavelengths $\lambda 2$, $\lambda 3$, and $\lambda 4$ of monitor light in addition to the signal light, but cuts off the wavelength $\lambda 1$ of monitor light. The optical filter 42 transmits therethrough the wavelengths $\lambda 1$, $\lambda 3$, and $\lambda 4$ of monitor light in addition to the signal light, but cuts off the wavelength $\lambda 2$ of monitor light. The optical filter 43 transmits therethrough the wavelengths $\lambda 1$, $\lambda 2$, and $\lambda 4$ of monitor light in addition to the signal light, but cuts off the wavelength $\lambda 3$ of monitor light. The optical filter 44 transmits therethrough the wavelengths $\lambda 1$, $\lambda 2$, and $\lambda 3$ of monitor light in addition to the signal light, but cuts off the wavelength $\lambda 4$ of monitor light. Here, each of the optical filters 41 to 44 is preferably disposed at a position immediately behind the branching section 20 in view of the fact that it can elongate the line section that can be monitored. Also, each of the optical filters 41 to 44 is preferably an optical fiber grating in view of the fact that its reflection wavelength band is so narrow that the total measurement wavelength band can be narrowed even if the wavelength intervals of the four channels of monitor light $\lambda 1$ to $\lambda 4$ become shorter; and the fact that its temperature compensation is easy.

Also, monitor light reflecting optical filters 51 to 54 are disposed at the respective terminals of the line sections that can be monitored in the four optical fiber lines 11 to 14. Each of the monitor light reflecting optical filters 51 to 54 reflects the monitor light having reached there (which has at least partly been cut off by the optical filters 41 to 44).

Figure 2:
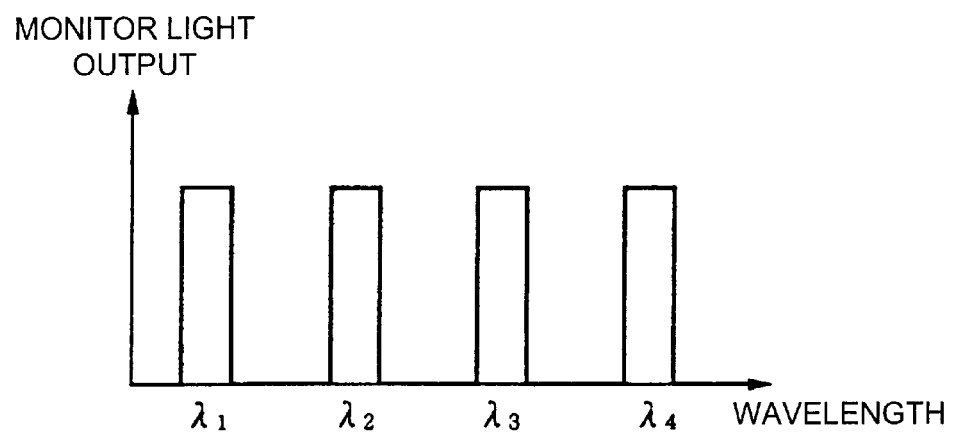
FIG. 2 is a chart showing wavelength spectra of four channels of monitor light included in the monitor light emitted from a wavelength-variable light source.

The OTDR apparatus 60 comprises a wavelength-variable light source 61, a directional coupler 62, a detection unit 63, and an arithmetic unit 64. The wavelength-variable light source 61 sequentially emits four channels of monitor light $\lambda 1$ to $\lambda 4$ having wavelengths different from the wavelength of signal light and different from each other as shown in FIG. 2. The directional coupler 62 introduces into the directional coupler 30 the monitor light components $\lambda 1$ to $\lambda 4$ outputted from the wavelength-variable light source 61, and introduces into the detection unit 63 the backscattering light of each monitor light component having reached there from the directional coupler 30. The detection unit 63 detects the backscattering light as a function of time, whereas the arithmetic unit 64 carries out an arithmetic operation according to the result of detection (intensity of detected backscattering light) obtained by the detection unit 63, thereby monitoring the respective states of four optical fiber lines 11 to 14.

The branch line monitoring method in accordance with the present invention, as well as operations of the embodiments of the branch line monitoring system in accordance with the present invention, will now be explained with reference to FIGS. 3A to 3D and 4A to 4D. FIGS. 3A to 3D are views for explaining how individual monitor light components emitted from the wavelength-variable light source propagate, showing the states of propagation of monitor light components having wavelengths of $\lambda 1$, $\lambda 2$, $\lambda 3$, and $\lambda 4$, respectively. In these drawings, parts of the optical fiber lines 11 to 14 indicated with thick lines show paths through which the monitor light propagates. On the other hand, FIGS. 4A to 4D are charts for explaining how the intensity of backscattering light detected by the detection unit 63 changes with time concerning monitor light emitted from the wavelength variable-light source, showing the changes of backscattering light intensity with time in monitor light components having wavelengths of $\lambda 1$, $\lambda 2$, $\lambda 3$, and $\lambda 4$, respectively.

Figure 3A:
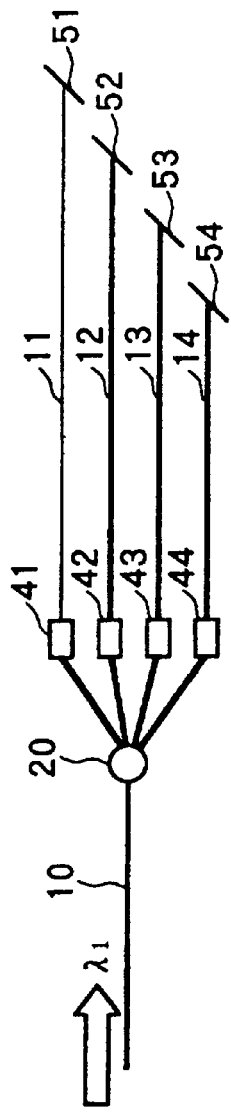
FIGS. 3A to 3D are views for explaining how individual monitor light components emitted from the wavelength-variable light source propagate, showing the states of propagation of monitor light components having wavelengths of $\lambda 1$, $\lambda 2$, $\lambda 3$, and $\lambda 4$, respectively.
Figure 4A:
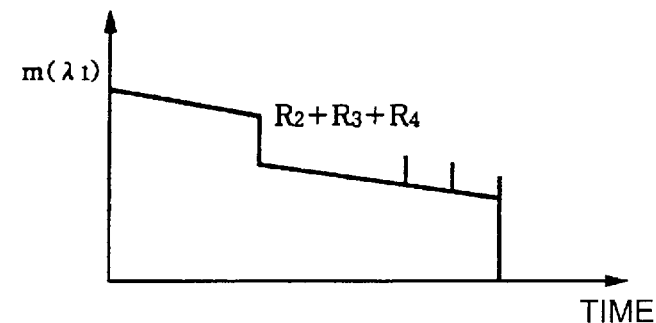
FIGS. 4A to 4D are charts for explaining how the intensity of backscattering light detected by a detection unit changes with time concerning monitor light emitted from the wavelength variable-light source, showing the changes of backscattering light intensity with time in monitor light components having wavelengths of $\lambda 1$, $\lambda 2$, $\lambda 3$, and $\lambda 4$, respectively.

When the monitor light component $\lambda 1$ is emitted from the wavelength-variable light source 61, it is branched into four parts by the branching section 20 as shown in FIG. 3A. The monitor light component $\lambda 1$ is cut off by the optical filter 41 and thus would not propagate through the optical fiber line 11 subsequent thereto, but passes through the optical filters 42, 43, and 44 in the optical fiber lines 12, 13, and 14, respectively. Therefore, letting R1 to R4 be the respective states of the optical fiber lines 11 to 14, the intensity $m(\lambda 1)$ of the backscattering light of monitor light component $\lambda 1$ detected by the detection unit 63 at this time is represented by $$m(\lambda 1) = R2 + R3 + R4,$$

as shown in FIG. 4A. Here, R1 to R4 represent the respective intensities of backscattering light when the optical fiber lines 11 to 14 are measured alone.

Figure 3B:
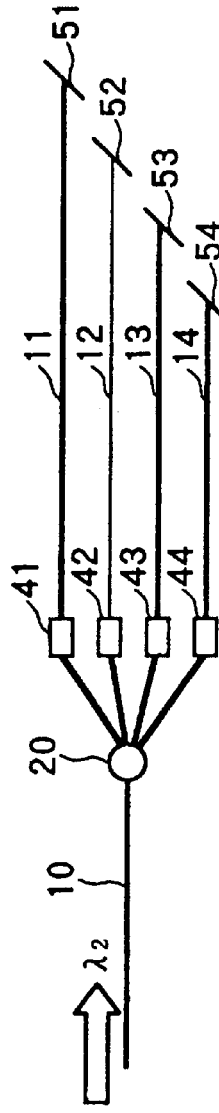
Figure 4B:
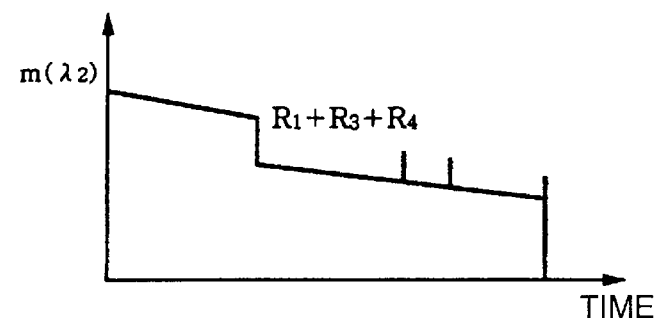

When the monitor light component $\lambda 2$ is emitted from the wavelength-variable light source 61, it is branched into four parts by the branching section 20 as shown in FIG. 3B and then is cut off by the optical filter 42, whereby it would not propagate through the optical fiber line 12 subsequent thereto. However, the monitor light component $\lambda 2$ passes through the optical filters 41, 43, and 44 in the optical fiber lines 11, 13, and 14, respectively. Therefore, the intensity $m(\lambda 2)$ of the backscattering light of monitor light component $\lambda 2$ detected by the detection unit 63 at this time is represented by $$m(\lambda 2) = R1 + R3 + R4,$$

as shown in FIG. 4B.

Figure 3C:
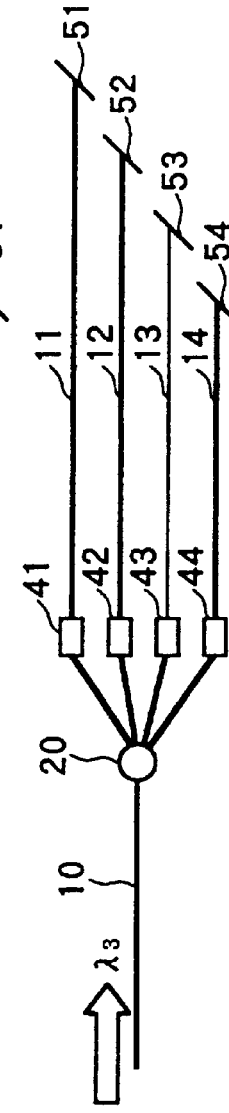
Figure 4C:
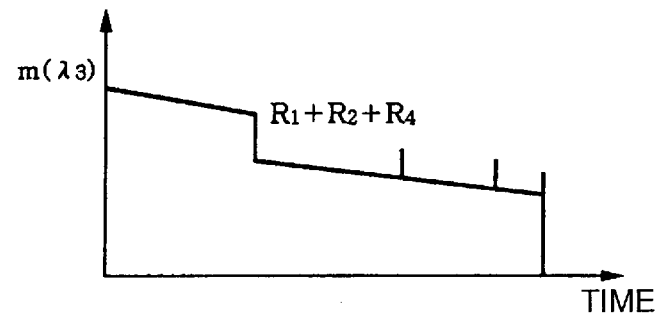

Also, when the monitor light component $\lambda 3$ is emitted from the wavelength-variable light source 61, it is branched into four parts by the branching section 20 as shown in FIG. 3C and then is cut off by the optical filter 43, whereby it would not propagate through the optical fiber line 13 subsequent thereto. However, the monitor light component $\lambda 3$ passes through the optical filters 41, 42, and 44 in the optical fiber lines 11, 12, and 14, respectively. Therefore, the intensity $m(\lambda 3)$ of the backscattering light of monitor light component $\lambda 3$ detected by the detection unit 63 at this time is represented by $$m(\lambda 3) = R1 + R2 + R4,$$

as shown in FIG. 4C.

Figure 3D:
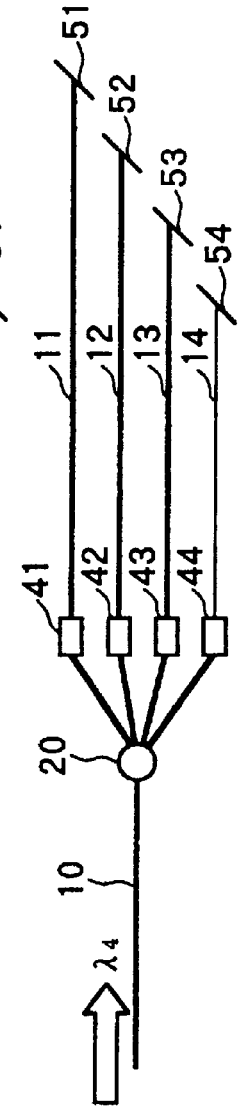
Figure 4D:
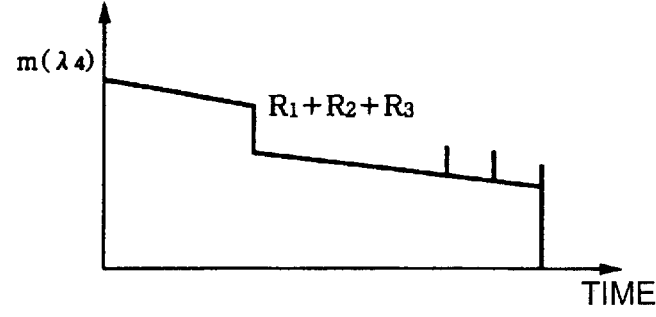

Further, when the monitor light component $\lambda 4$ is emitted from the wavelength-variable light source 61, it is branched into four parts by the branching section 20 as shown in FIG. 3D and then is cut off by the optical filter 44, whereby it would not propagate through the optical fiber line 14 subsequent thereto. However, the monitor light component $\lambda 4$ passes through the optical filters 41, 42, and 43 in the optical fiber lines 11, 12, and 13, respectively. Therefore, the intensity $m(\lambda 4)$ of the backscattering light of monitor light component $\lambda 4$ detected by the detection unit 63 at this time is represented by $$m(\lambda 4) = R1 + R2 + R3 \qquad (1),$$

as shown in FIG. 4D.

Then, the arithmetic unit 64 determines the sum M of $m(\lambda 1)$ to $m(\lambda 4)$ mentioned above as $$M = \sum_{i=1}^{n} m(\lambda i) = 3 \cdot (R1 + R2 + R3 + R4), \qquad (2)$$

and determines the respective states R1 to R4 of the optical fiber lines 11 to 14 according to the following expressions:

$$R1 = M/3 - m(\lambda 1) \qquad (3a)$$

$$R2 = M/3 - m(\lambda 2) \qquad (3b)$$

$$R3 = M/3 - m(\lambda 3) \qquad (3c)$$

$$R4 = M/3 - m(\lambda 4) \qquad (3d).$$

Alternatively, the respective states R1 to R4 of the optical fiber lines 11 to 14 may be determined according to the following expressions:

$$R1 = M - 3 \cdot m(\lambda 1)$$

$$R2 = M - 3 \cdot m(\lambda 2)$$

$$R3 = M - 3 \cdot m(\lambda 3)$$

$$R4 = M - 3 \cdot m(\lambda 4).$$

Alternatively, the respective states R1 to R4 of the optical fiber lines 11 to 14 may be determined according to the following expressions:

$$R1 = k\{M - 3 \cdot m(\lambda 1)\}$$

$$R2 = k\{M - 3 \cdot m(\lambda 2)\}$$

$$R3 = k\{M - 3 \cdot m(\lambda 3)\}$$

$$R4 = k\{M - 3 \cdot m(\lambda 4)\}.$$

Here, k is the constant of proportion.

Thus, in the specific examples mentioned above, monitor light can be utilized efficiently ((n−1) channels of monitor light are utilized for monitoring each of n (=4) optical fiber lines), whereby the measurement wavelength band is wider even when compared with the conventional techniques utilizing one channel of monitor light for monitoring one optical fiber line, which improves the S/N ratio of measurement information. Also, the branching section 20 can be constructed inexpensively since a commonly utilized branching device can be used therefor in place of an expensive AWG. Further, in the specific examples mentioned above, the fading noise resulting from the coherence of monitor light is reduced since the intensities $m(\lambda 1)$ to $m(\lambda 4)$ of the respective backscattering light components of four channels of monitor light are added together.

Figure 6A:
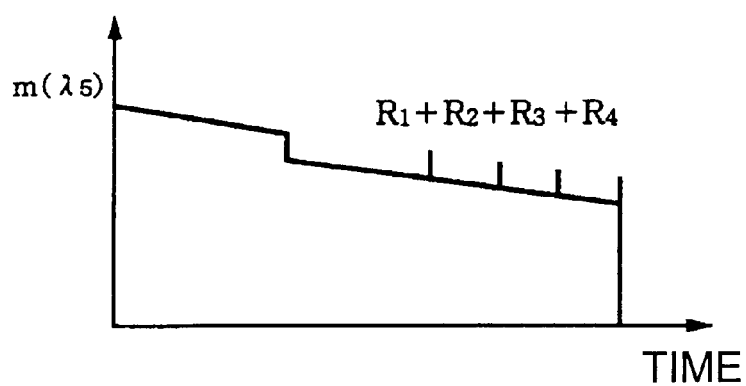
FIGS. 6A and 6B are charts for explaining how the intensity of backscattering light detected by the detection unit changes with time concerning the probe light having a wavelength of $\lambda 5$ emitted from the wavelength-variable light source, showing the changes of backscattering light intensity with time under a normal operation such as one shown in FIG. 5A and in the case where a failure has occurred as shown in FIG. 5B, respectively.
Figure 6B:
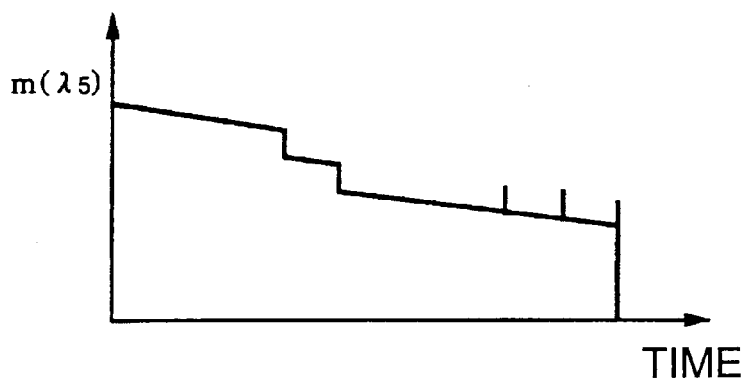

The wavelength-variable light source 61 may be configured so as to emit not only the monitor light components $\lambda 1$ to $\lambda 4$ but also probe light including a wavelength $\lambda 5$ (wavelength not cut off by any of the optical filters 41 to 44) which is different from that of the signal light and these wavelength components. FIGS. 5A and 5B are views for explaining how probe light having a wavelength of $\lambda 5$ emitted from the wavelength-variable light source 61 propagates, showing the states of propagation in individual branch lines under a normal operation and in the case where a failure has occurred in part of the branch lines, respectively. On the other hand, FIGS. 6A and 6B are charts for explaining how the intensity of backscattering light detected by the detection unit 63 changes with time concerning the probe light having a wavelength of $\lambda 5$ emitted from the wavelength-variable light source 61, showing the changes of backscattering light intensity with time under a normal operation such as one shown in FIG. 5A and in the case where a failure has occurred as shown in FIG. 5B, respectively.

In this specific example, when the monitor light component $\lambda 5$ is emitted from the wavelength-variable light source 61, as shown in FIG. 5A, it is branched into four parts by the branching section 20 and then passes through the individual optical filters 41 to 44, so as to propagate through the individual optical fiber lines 11 to 14. Therefore, the intensity $m(\lambda 5)$ of the backscattering light of monitor light component $\lambda 5$ detected by the detection unit 63 at this time is the sum of all the respective backscattering light components generated in the optical fiber lines 11 to 14 as shown in FIG. 6A. However, if a break (indicated by X in the drawing) occurs in the optical fiber line 14 as shown in FIG. 5B, for example, then the intensity $m(\lambda 5)$ of the backscattering light of monitor light component $\lambda 5$ detected by the detection unit 63 additionally includes the backscattering light generated in the optical fiber line. 14 in the portion thereof extending up to the site of break as shown in FIG. 6B.

Namely, the arithmetic unit 64 can usually monitor the whole 1:4 optical communications line according to the emission of monitor light component $\lambda 5$ by the wavelength-variable light source 61 and the detection of the intensity of its resulting backscattering light by the detection unit 63. If such a configuration detects that ac failure such as break has occurred in any site of optical fiber lines which are branch lines, then the wavelength-variable light source 61 newly emits wavelengths $\lambda 1$ to $\lambda 4$ of monitor light, and the detection unit 63 detects the intensity of backscattering light of the monitor light, whereby the arithmetic unit 64 detects not only which of optical fiber lines 11 to 14 has failed but also where the failure is. This simplifies the monitoring under a normal operation, thus yielding a favorable efficiency.

In a specific example corresponding to the second embodiment, each of the optical fiber lines 11 to 14 is monitored by use of the above-mentioned probe light having a wavelength of $\lambda 5$ and four channels $\lambda 1$ to $\lambda 4$ of monitor light. Namely, the arithmetic unit 64 determines the respective states R1 to R4 of the optical fibers 11 to 14 by the following expressions:

$$R1=k\{m(\lambda 5)-m(\lambda 1)\}$$

$$R2=k\{m(\lambda 5)-m(\lambda 2)\}$$

$$R3=k\{m(\lambda 5)-m(\lambda 3)\}$$

$$R4=k\{m(\lambda 5)-m(\lambda 4)\}.$$

Such a configuration enables a desirable optical fiber line to be measured by two measurement operations, and can specify sat least sites of breaks and sites where loss fluctuates greatly.

In the foregoing explanation, the optical filters 41, 42, 43, 44 have a transmission loss of 100% with respect to the wavelengths λ1, λ2, λ3, λ4 of monitor light, respectively. However, the transmission loss of each optical filter is not required to be 100%, but preferably 90% or more and sufficient if it is 30% or more.

Figure 7:
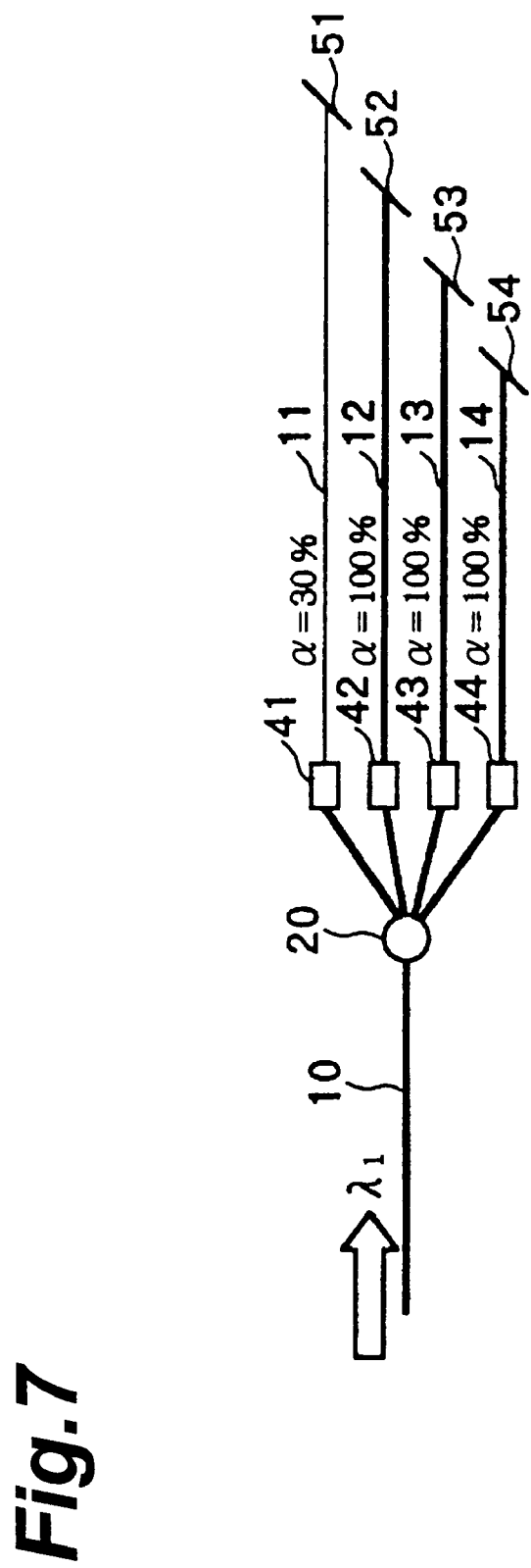
FIG. 7 is a view for explaining the propagation of monitor light in the case where one of four optical filters has a transmission loss of 30%.

The case where the optical filter 41 in the four optical filters 41 to 44 has a transmission loss α of 30% whereas the other optical filters 42 to 44 have a transmission loss α of 100% will now be explained. FIG. 7 is a view for explaining the propagation of monitor light in the case where the optical filter 41 in the four optical filters 41 to 44 has a transmission loss α of 30%. On the other hand, FIG. 8 is a chart for explaining how the intensity of backscattering light detected by the detection unit 63 changes with time in the case where the optical filter 41 in the four optical filters 41 to 44 has a transmission loss α of 30%.

Figure 8:
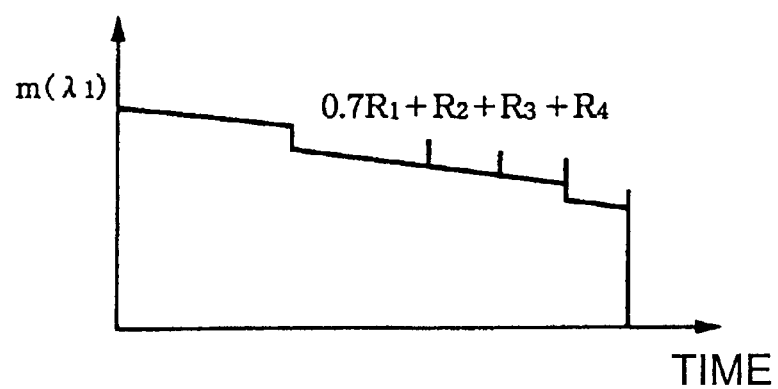
FIG. 8 is a chart for explaining how the intensity of backscattering light detected by the detection unit changes with time in the case where one of four optical filters has a transmission loss of 30%.

In this case, as shown in FIG. 7, the wavelength λ1 of monitor light emitted from the wavelength-variable light source 61 is branched into four parts by the branching section 20. Then, of the monitor light component directed to the optical fiber line 11, 30% is cut off by the optical filter 41, whereas the remaining 70% is transmitted therethrough and propagates through the optical fiber line 11. Of the monitor light component directed to the optical fiber line 12, 100% is transmitted through the optical filter 42, so as to propagate through the optical fiber line 12. Of the monitor light component directed to the optical fiber line 13, 100% is transmitted through the optical filter 43, so as to propagate through the optical fiber line 13. Of the monitor light component directed to the optical fiber line 14, 100% is transmitted through the optical filter 44, so as to propagate through the optical fiber line 14. Therefore, the intensity m(λ1) of the backscattering light of monitor light component (with a wavelength of λ1), having propagated through the optical fiber lines 11 to 14, detected by the detection unit 63 at this time is represented by $$m(\lambda 1)=0.7\times R1+R2+R3+R4+,$$

as shown in FIG. 8.

Then, the arithmetic unit 64 subtracts m(λ1) from ⅓ of the sum of m(λ1) to m(λ4), thereby yielding $$0.53\times R1,$$

as the state of the optical fiber line 11. Though the S/N ratio in this state lowers to ½ of that in the case where the transmission loss α of the optical filter 41 is 100%, it is still favorable when compared with the case using the band-pass filters of the first conventional technique where the S/N ratio lowers to ¼.

Figure 9:
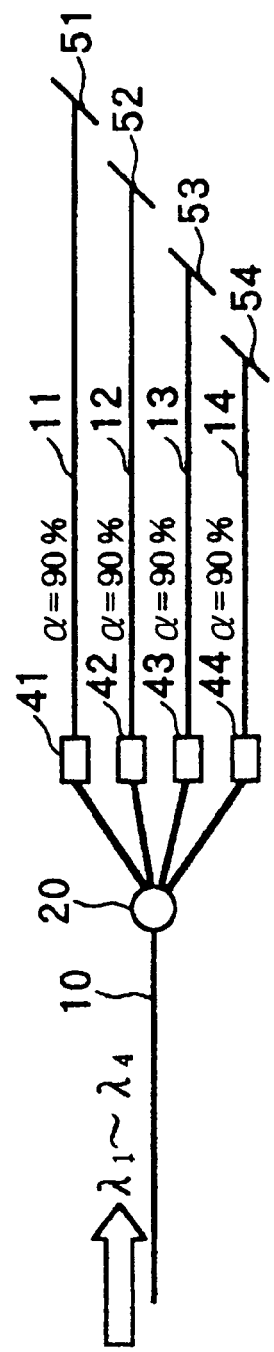
FIG. 9 is a view for explaining the propagation of monitor light in the case where each of four optical filters has a transmission loss of 90%.
Figure 10:
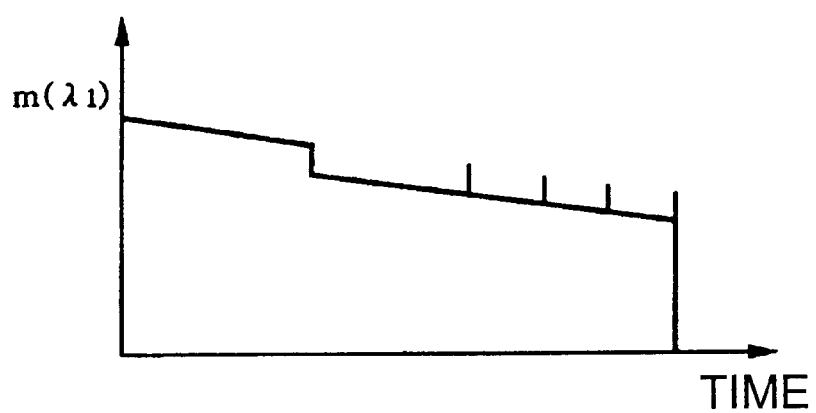
FIG. 10 is a chart for explaining how the intensity of backscattering light detected by the detection unit changes with time in the case where each of four optical filters has a transmission loss of 90%.

The case where the four optical filters 41 to 44 each have a transmission loss α of 90% will now be explained. FIG. 9 is a view for explaining the propagation of monitor light in the case where each of the four optical filters 41 to 44 has a transmission loss α of 90%. FIG. 10 is a chart for explaining how the intensity of backscattering light detected by the detection unit 63 changes with time in the case where each of the four optical filters 41 to 44 has a transmission loss of 90%.

In this case, as shown in FIG. 9, the wavelength λ1 of monitor light emitted from the wavelength-variable light source 61 is branched by the branching section 20 into four parts. Then, of the monitor light component directed to the optical fiber line 11, 90% is cut off by the optical filter 41, whereas the remaining 10% propagates through the optical fiber line 11. Of the monitor light component directed to the optical fiber line 12, 100% is transmitted through the optical filter 42, so as to propagate through the optical fiber line 12. Of the monitor light component directed to the optical fiber line 13, 100% is transmitted through the optical filter 43, so as to propagate through the optical fiber line 13 of the monitor light component directed to the optical fiber line 14, 100% is transmitted through the optical filter 44, so as to propagate through the optical fiber line 14. Similar procedures apply to the other wavelengths of monitor light. Therefore, the intensities m(λ1) to m(λ4) of the backscattering light detected by the detection unit 63 at this time are represented by $$m(\lambda 1)=0.1\times R1+R2+R3+R4$$

$$m(\lambda 2)=R1+0.1\times R2+R3+R4$$

$$m(\lambda 3)=R1+R2+0.1\times R3+R4$$

$$m(\lambda 4)=R1+R2+R3+0.1\times R4,$$

as shown in FIG. 10.

Then, the arithmetic unit 64 subtracts m(λ1) from ⅓ of the sum of m(λ1) to m(λ4), thereby yielding $$0.93\times R1-0.03\times (R2+R3+R4)$$

as the state of the optical fiber line 11. Though the second term of this expression (4) becomes noise, it is practically unproblematic since the influence of the second term is sufficiently smaller than that of the first term.

In cases where any of the four optical filters 41 to 44 has a transmission loss α of less than 100%, including the two cases explained above, i.e., the case where the optical filter 41 in the four optical filters 41 to 44 has a transmission loss of 30% whereas the other three optical filters 42 to 44 each have a transmission loss α of 100% and the case where the four optical filters 41 to 44 each have a transmission loss α of 90%, the intensities m(λ1) to m(λ4) of the backscattering light detected by the detection unit 63 are multiplied by coefficients corresponding to the respective transmission losses α of the four optical filters 41 to 44, and then arithmetic operations are carried out according to expressions (1), (2), and (3a) to (3d), so as to determine the respective states R1 to R4 of the optical fiber lines 11 to 14, whereby a noise component such as one appearing in the second term of expression (4) can be eliminated.

Figure 11A:
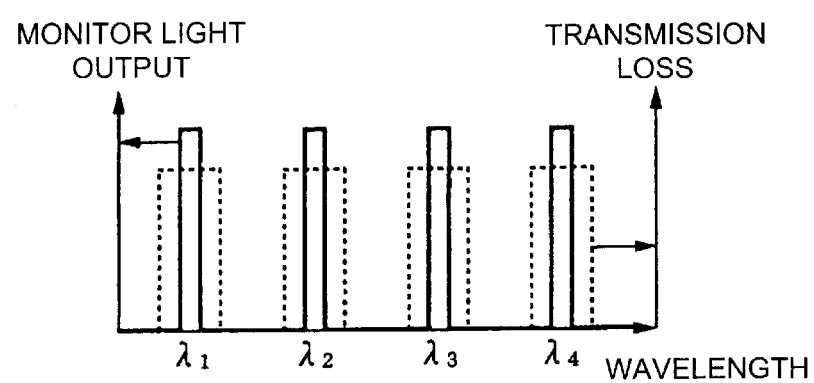
FIGS. 11A and 11B are charts for explaining relationships between the wavelength of monitor light outputted from the wavelength-variable light source and the respective cutoff characteristics of four optical filters, showing the state where each monitor light wavelength is within the cutoff wavelength range of the corresponding optical filter (normal state) and the state where the monitor light wavelength deviates from the cutoff wavelength range of the optical filter, respectively.

Relationships between the wavelength of monitor light emitted from the wavelength-variable light source 61 and the respective cutoff characteristics of optical filters 41 to 44 will now be explained with reference to FIGS. 11A and 11B. As shown in FIG. 11A, the four channels of monitor light emitted from the wavelength-variable light source 61 each have a definite wavelength bandwidth, and the n optical filters 41 to 44 each have a definite cutoff wavelength bandwidth, too. It is preferred that the wavelength bands of wavelengths λ1, λ2, λ3, λ4 of monitor light be included in the cutoff wavelength bands of the optical filters 41, 42, 43, 44, respectively.

Figure 11B:
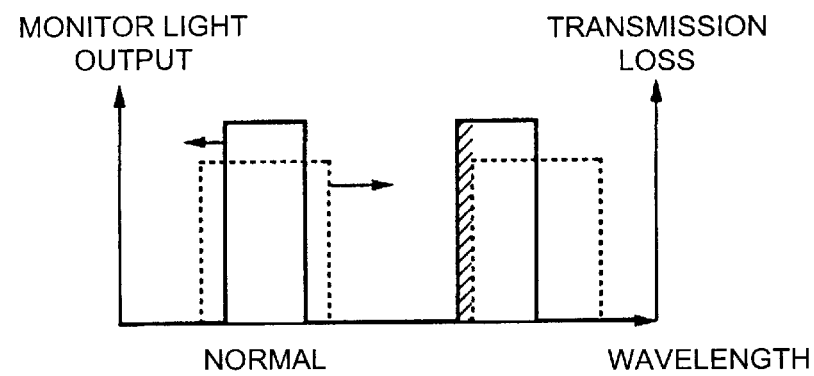

If the wavelength band of a certain wavelength of monitor light has a part (hatched part in the chart) not included in the cutoff wavelength band of an optical filter as shown in FIG. 11B, however, then this part of monitor light becomes noise without being cut off by the optical filter. Therefore, it is preferred that the four optical filters 41 to 44 each have a constant cutoff wavelength independent of temperature. Alternatively, if the respective cutoff wavelengths of the optical filters 41 to 44 are dependent on temperature, then it is preferred that a temperature control apparatus for controlling their temperature be further provided.

Figure 12:
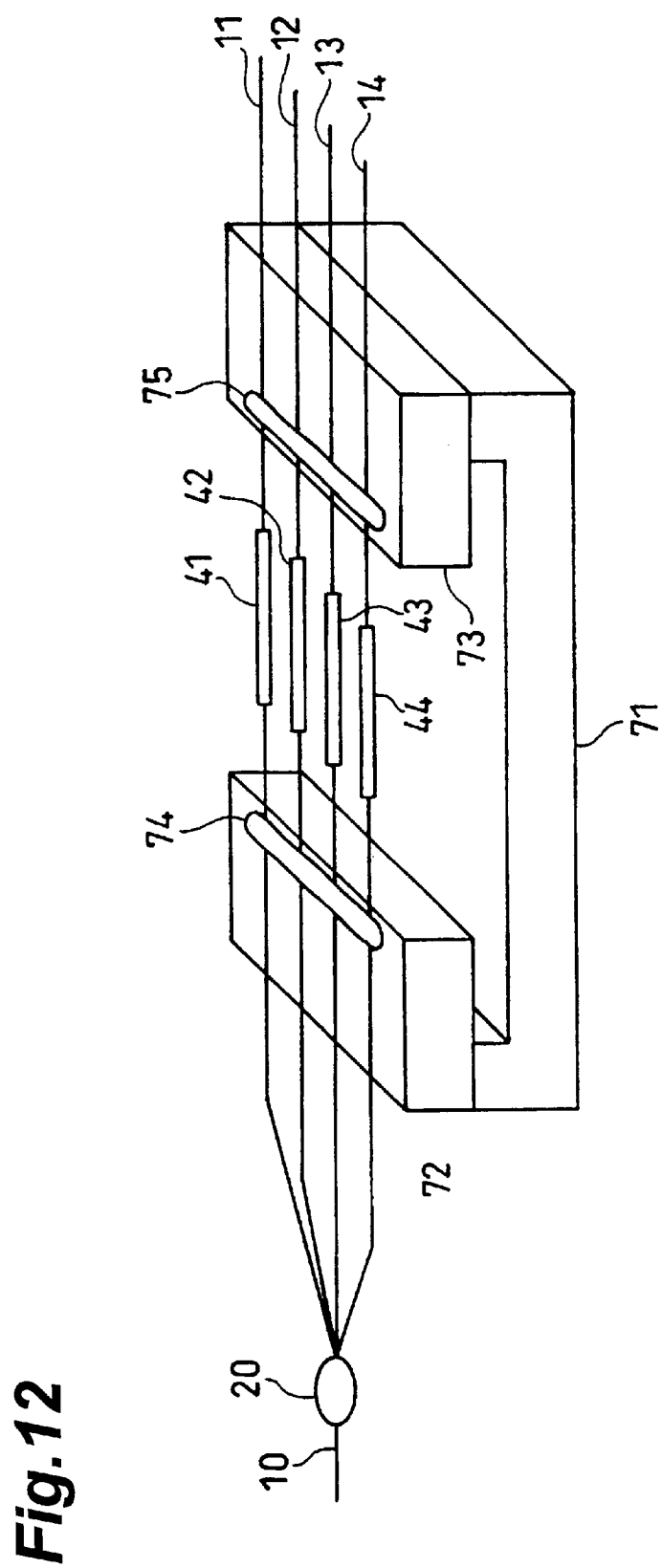
FIG. 12 is a perspective view showing an apparatus for making cutoff wavelengths constant independently of temperature in the case where four optical filters 41 to 44 are realized by respective optical fiber gratings.

FIG. 12 is a perspective view showing an apparatus for making cutoff wavelengths constant independently of temperature in the case where the four optical filters 41 to 44 are realized by respective optical fiber gratings. As shown in this drawing, the apparatus comprises an iron-made member 71 having a recessed cross section, and two aluminum-made rectangular members 72, 73 disposed on the iron-made member 71 so as to be distanced from each other. The optical fiber lines 11 to 14 are secured onto the aluminum-made members 72, 73 with adhesives 74, 75 in a state where an appropriate tension is applied thereto such that the optical filters 41 to 44 made of optical fiber gratings are positioned between the aluminum-made members 72, 73. The positions of the adhesives. 74, 75 (bonding positions) are located inside the positions where the aluminum-made members 72, 73 are secured to the iron-made member 71.

If temperature rises, then the aluminum-made members 72, 73 having a coefficient of thermal expansion higher than that of the iron-made member 71 each thermally expand, so that the optical fiber gratings relax their tension, whereby their cutoff wavelengths shift toward the shorter wavelength side. On the other hand, it causes the optical fiber gratings to raise the average refractive index, whereby their cutoff wavelengths shift toward the longer wavelength side. Eventually, the shifts in cutoff wavelengths cancel each other, whereby the cutoff wavelengths are kept constant independently of temperature. Similarly, if temperature lowers, then the aluminum-made members 72, 73 each thermally contract, so that the cutoff wavelengths shift toward the longer wavelength side, whereas the optical fiber gratings lower the average refractive index, so that the cutoff wavelengths shift toward the shorter wavelength side. Eventually, the shifts in cutoff wavelengths cancel each other, whereby the cutoff wavelengths are kept constant independently of temperature.

In the present invention, as in the foregoing, each of n channels of monitor light, having wavelengths different from each other, emitted from a light source, is introduced by way of a branching device into n branch lines to be monitored and, while being intended to propagate through a branch line subsequent to an optical filter for cutting off the respective monitor light component in the n branch lines, propagates through the remaining (N−1) branch lines, thereby generating backscattering light according to the states of these branch lines. Then, arithmetic operations according to the result of detection concerning the respective detected backscattering light components of n channels of monitor light specify the respective states of n branch lines.

Thus, monitor light can be utilized efficiently ((n−1) channels of monitor light are utilized for monitoring one branch line), whereby the measurement wavelength band is wider than that conventionally available, which improves the S/N ratio. Also, an inexpensive system can be realized since a commonly utilized branching device can be used for the branching section in place of an expensive AWG. Further, since the respective intensities of backscattering light of n channels of monitor light are added together, the fading noise resulting from the coherence of monitor light is reduced.

Even in the case where n optical filters each have a transmission loss of 30% or more with respect to the wavelength of monitor light to be cut off in n channels of monitor light, the respective states of n branch lines can be determined with a better S/N ratio than that obtained when a conventional band-pass filter is used. Also, in the case where the n optical filters each have a transmission loss of 90% or more with respect to the wavelength of monitor light to be cut off in n channels of monitor light, the noise component is scarce, whereby the respective states of n branch lines can be determined with a better S/N ratio.

In the case where each of the n optical filters is an optical fiber grating, it has a narrow band, whereby, even if the respective wavelength bands of n channels of monitor light are close to each other, it can narrow the wavelength band of the whole monitor wavelength band light, and facilitates temperature compensation. On the other hand, if the branching section is a star coupler, then an inexpensive branch line monitoring system can be realized.

In the case where the respective wavelength bandwidths of n channels of monitor light emitted from the light source are definite, the respective cutoff wavelength bandwidths of n optical filters are definite, and the wavelength bandwidth of each of then channels of monitor light is included in any of the cutoff wavelength bands of n optical filters, the noise transmitted through the optical filters is reduced, whereby the respective states of n branch lines are determined with a favorable S/N ratio .

The branch line monitoring system may further comprise a temperature control apparatus for controlling the respective temperatures of n optical filters, and the respective cutoff wavelengths of n optical filters may be constant independently of temperature. In any case, the respective states of n branch lines can be determined stably.

In th e case where a predetermined arithmetic expression is used while letting λi (i=1, 2, . . . , n) be the wavelength of any of n channels of monitor light, m(λi) be the result of detection by a backscattering light detector, and k be the constant of proportion, so as to determine the state Ri of a branch line provided with an optical filter for cutting off the wavelength λi of monitor light in the n branch lines, the respective states of n branch lines can be determined with a favorable S/N ratio by use of this simple arithmetic expression alone.

In the case where the light source also outputs probe light having a wavelength different from the respective wavelengths of signal light and n channels of monitor light, all of the n branch lines can be monitored simultaneously, whereby the monitoring upon a normal operation can be simplified. The respective states of n branch lines can also be determined by use of this probe light and n channels of monitor light.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A branch line monitoring system for monitoring n ($\geq 3$) branch lines into which a predetermined wavelength of signal light is introduced by way of a branching device, said system comprising:

a light source for emitting n channels of monitor light having wavelengths different from the wavelength of said signal light and different from each other;

a monitor light introducing structure for introducing into each of said n branch lines by way of said branching device said n channels of monitor light emitted from said light source;

n optical filters each functioning to cut off respective one of said n channels of monitor light but transmit therethrough the remaining (N−1) channels of signal light and being provided so as to propagate said transmitted (n−1) channels of monitor light and signal light through respective one of said n branch lines;

a backscattering light detector for detecting, by way of said n optical filters and said branching-device, respective backscattering light components of said (N−1) channels of monitor light generated in each of said n branch lines from each of said n branch lines through-which said (N−1) channels of monitor light transmitted through the corresponding one of said n optical filters propagate; and an arithmetic unit for specifying, based on a result of detection concerning backscattering light obtained by said backscattering light detector, at least a loss distribution state of each of said n branch lines along a longitudinal direction thereof.

2. A branch line monitoring system according to claim 1, wherein said n optical filters each have a transmission loss of 30% or more with respect to a wavelength to be cut off in said n channels of monitor light.

3. A branch line monitoring system according to claim 2, wherein said n optical filters each have a transmission loss of 90% or more with respect to a wavelength to be cut off in said n channels of monitor light.

4. A branch line monitoring system according to claim 1, wherein said n optical filters each include an optical fiber grating.

5. A branch line monitoring system according to claim 1, wherein said branching device includes a star coupler.

6. A branch line monitoring system according to claim 1, wherein said n channels of monitor light emitted from said light source each have a definite wavelength band, wherein said n optical filters each have a definite cutoff wavelength band, and wherein each wavelength band of said n channels of monitor light is included in the cutoff wavelength band of any of said n optical filters.

7. A branch line monitoring system according to claim 1, further comprising a temperature control apparatus for controlling respective temperatures of said n optical filters.

8. A branch line monitoring system according to claim 1, wherein said n optical filters each have a cutoff wavelength which is constant independently of temperature.

9. A branch line monitoring system according to claim 1, wherein, letting $\lambda i$ (i=1, 2, ..., n) be the wavelength of each of said n channels of monitor light, $m(\lambda i)$ be the result of detection obtained by said backscattering light detector, and k be the constant of proportion, said arithmetic unit determines a parameter Ri indicative of the loss distribution state along the longitudinal direction of the branch line provided with the optical filter for cutting off said wavelength $\lambda i$ of monitor light in said n branch lines according to the following arithmetic expressions:

$$M = \sum_{i=1}^{n} m(\lambda i);$$

$Ri=k\{M-(n-1)\cdot \underline{m}(\lambda i)\}(i=1, 2, \ldots n)$.

10. A branch line monitoring system according to claim 1, wherein said light source emits probe light having a wavelength different from that of any of said signal light and said n channels of monitor light.

11. A branch line monitoring system according to claim 10, wherein, letting $\lambda i$ (i=1, 2, ..., n) be the wavelength of each of said n channels of monitor light, $\lambda 0$ be the wavelength of said probe light, $m(\lambda 0)$ and $m(\lambda i)$ be the result of detection obtained by said backscattering light detector, and k be the constant of proportion, said arithmetic unit determines a parameter Ri indicative of the loss distribution state along the longitudinal direction of the branch line provided with the optical filter for cutting off said wavelength $\lambda i$ of monitor light in said n branch lines according to the following arithmetic expression:

$Ri=k\{m(\lambda 0)-m(\lambda i)\}(i=1, 2, \ldots n)$.

12. A branch line monitoring method for monitoring n ($\geq 3$) branch lines into which a predetermined wavelength of signal light is introduced by way of a branching device, said method comprising the steps of:

preparing a light source for emitting n channels of monitor light having wavelengths different from the wavelength of said signal light and different from each other;

disposing n optical filters, each said optical filter cutting off respective one of said n channels of monitor light but transmitting therethrough the remaining (N−1) channels of signal light, so as to propagate said transmitted (N−1) channels of monitor light and signal light through respective one of said n branch lines;

detecting, by way of said n optical filters and said branching device, respective backscattering light components of said (N−1) channels of monitor light generated in each of said n branch lines from each of said n branch lines through which said (N−1) channels of monitor light transmitted through the corresponding one of said n optical filters propagate; and specifying, based on thus obtained result of detection concerning backscattering light, at least a loss distribution state of each of said n branch lines along a longitudinal direction thereof.

13. A branch line monitoring method according to claim 12, wherein, letting $\lambda i$ (i=1, 2, ..., n) be the wavelength of each of said n channels of monitor light, $m(\lambda i)$ be the result of detection concerning the backscattering light of said wavelength $\lambda i$, and k be the constant of proportion, a parameter Ri indicative of the loss distribution state along the longitudinal direction of the branch line provided with the optical filter for cutting off said wavelength $\lambda i$ of monitor light in said n branch lines is determined according to the following arithmetic expressions:

$$M = \sum_{i=1}^{n} m(\lambda i);$$

$Ri=k\{M-(n-1)\cdot \underline{m}(\lambda i)\}(i=1, 2, \ldots n)$.

14. A branch line monitoring method according to claim 12, wherein said light source emits probe light having a wavelength different from that of any of said signal light and said n channels of monitor light.

15. A branch line monitoring method according to claim 14, wherein, letting $\lambda i$ (i=1, 2, ..., n) be the wavelength of each of said n channels of monitor light, $\lambda 0$ be the wavelength of said probe light, $m(\lambda 0)$ and $m(\lambda i)$ be the result of detection concerning said wavelength $\lambda i$ of monitor light and probe light, and k be the constant of proportion, a parameter Ri indicative of the loss distribution state along the longitudinal direction of the branch line provided with the optical filter for cutting off said wavelength $\lambda i$ of monitor light in said n branch lines is determined according to the following arithmetic expression:

$$Ri=k\{m(\lambda 0)-m(\lambda i)\}(i=1, 2, \ldots, n).$$

* * * * *